(12) United States Patent
Yoshida

(10) Patent No.: US 10,412,304 B2
(45) Date of Patent: Sep. 10, 2019

(54) IMAGE PICKUP APPARATUS CAPABLE OF PERFORMING AUTOMATIC BOUNCE DRIVE CONTROL, IMAGE PICKUP SYSTEM, AUTOMATIC IRRADIATION DIRECTION CONTROL METHOD, AND STORAGE MEDIUM

(71) Applicant: CANON KABUSHIKI KAISHA, Tokyo (JP)

(72) Inventor: Nobukazu Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/787,986

(22) Filed: Oct. 19, 2017

(65) Prior Publication Data

US 2018/0115712 A1  Apr. 26, 2018

(30) Foreign Application Priority Data

Oct. 25, 2016 (JP) .................................. 2016-208651

(51) Int. Cl.
  *H04N 5/232* (2006.01)
  *H04N 5/225* (2006.01)
  (Continued)

(52) U.S. Cl.
  CPC ........... *H04N 5/23245* (2013.01); *G03B 7/17* (2015.01); *G03B 15/05* (2013.01); *H04N 5/2256* (2013.01);
  (Continued)

(58) Field of Classification Search
  CPC .................................................. H04N 5/23245
  (Continued)

(56) References Cited

U.S. PATENT DOCUMENTS

2004/0119840 A1* 6/2004 Ishihara ............... H04N 1/2112
   348/222.1
2012/0287324 A1* 11/2012 Kudo .................... H04N 5/2251
   348/333.01
(Continued)

FOREIGN PATENT DOCUMENTS

JP  04-340527 A  11/1992
TW  457394 B  10/2001

OTHER PUBLICATIONS

The above patent documents were cited in the Jul. 6, 2018 Taiwanese Office Action, which is enclosed with an English Translation, that issued in Taiwanese Patent Application No. 106136473.

*Primary Examiner* — Joel W Fosselman
(74) *Attorney, Agent, or Firm* — Cowan, Liebowitz & Latman, P.C.

(57) ABSTRACT

An image pickup apparatus capable of preventing degradation of user-friendliness during execution of automatic bounce drive control. A strobe device can change an irradiation direction of light from a strobe head. The automatic bounce drive control determines an irradiation direction of the light based on a result of ranging of a target object, and drives the strobe head in the determined irradiation direction. When a switch unrelated to the automatic bounce drive control is operated during execution of the control, out of control related to an operation of the switch and the automatic bounce drive control, the automatic bounce drive control is preferentially executed, whereas when a switch related to the automatic bounce drive control is operated during execution of the control, out of the control related to an operation of the switch and the automatic bounce drive control, control related to the operation of the switch is preferentially executed.

10 Claims, 11 Drawing Sheets

(51) Int. Cl.
*G03B 15/05* (2006.01)
*G03B 7/17* (2014.01)
*H04N 5/235* (2006.01)

(52) U.S. Cl.
CPC ....... *H04N 5/2354* (2013.01); *H04N 5/23248* (2013.01); *G03B 2215/0521* (2013.01)

(58) Field of Classification Search
USPC .................................. 348/370, 231.99–231.3
See application file for complete search history.

(56) References Cited

U.S. PATENT DOCUMENTS

| | | |
|---|---|---|
| 2014/0240950 A1 | 8/2014 | Ueda |
| 2015/0036042 A1 | 2/2015 | Umehara |
| 2015/0062861 A1 | 3/2015 | Yamashita |
| 2015/0309390 A1* | 10/2015 | Yamamoto ............. G03B 15/05 |
| | | 348/370 |

* cited by examiner

IMAGE PICKUP APPARATUS CAPABLE OF PERFORMING AUTOMATIC BOUNCE DRIVE CONTROL, IMAGE PICKUP SYSTEM, AUTOMATIC IRRADIATION DIRECTION CONTROL METHOD, AND STORAGE MEDIUM

BACKGROUND OF THE INVENTION

Field of the Invention

The present invention relates to an image pickup apparatus that is capable of performing automatic bounce drive control, an image pickup system, an automatic irradiation direction control method, and a storage medium.

Description of the Related Art

As a method of shooting by a camera (image pickup apparatus) having a strobe device attached thereto, there has been known a shooting method referred to as bounce strobe shooting in which strobe light is emitted toward a ceiling and the like, and an object is illuminated by diffusely reflected light from the ceiling or the like. Bounce strobe shooting makes it possible to indirectly illuminate an object, and hence the object can be shot in soft light.

As to the bounce strobe shooting, an automatic bounce drive control technique has been put into practical use as a technique for automatically enabling optimum bounce shooting without requiring a user (photographer) to set an illumination angle (bounce angle) of strobe light. In the automatic bounce drive control, preliminary light emission using the strobe device, laser irradiation, or the like is performed to measure reflected light from an object, and reflected light from a ceiling, by a light receiving sensor of the strobe device. Then, an optimum bounce angle is determined based on obtained measured values so as to make it possible to shoot the object in soft light, and a strobe emission section of the strobe device is driven such that the head angle of the strobe emission section becomes equal to the determined bounce angle.

Particularly, in recent years, there has been proposed a technique for improving the user-friendliness of the strobe device for performing an automatic bounce drive control process. For example, a technique is proposed which is capable of automatically setting an angle of the strobe emission section at which strobe light is irradiated toward the ceiling for bounce strobe shooting, based on a distance from a camera body to a ceiling and a distance from the camera body to an object (see e.g. Japanese Patent Laid-Open Publication No. H04-340527).

Incidentally, in the above-described automatic bounce drive control according to Japanese Patent Laid-Open Publication No. H04-340527, it is required to perform distance measurement (ranging) of the distances from the camera body to the ceiling and the object. Therefore, from the viewpoint of preventing the reduction of ranging accuracy, it is required to avoid operations that will cause vibrations in the camera and the strobe device during execution of the automatic bounce drive control, such as operations of switches provided on the camera and the strobe device. To meet this requirement, it is envisaged to inhibit all the operations of the switches provided on the camera and the strobe device during execution of the automatic bounce drive control.

However, if all the operations of the switches provided on the camera and the strobe device are inhibited, it is impossible to perform operations for interrupting automatic bounce drive control being executed to perform new automatic bounce drive control, for example, an operation of a power switch of the strobe device. As a consequence, to perform the new automatic bounce drive control, the user is required to wait for termination of the automatic bounce drive control being executed, which causes a problem of degradation of user-friendliness during execution of the automatic bounce drive control.

SUMMARY OF THE INVENTION

The present invention provides an image pickup apparatus that is capable of preventing degradation of user-friendliness during execution of automatic bounce drive control, an image pickup system, an automatic irradiation direction control method, and a storage medium.

In a first aspect of the present invention, there is provided an image pickup apparatus that includes a lighting device capable of changing an irradiation direction of light from a light emission section or can have the lighting device attached thereto, and further includes various switches, the image pickup apparatus being configured to perform automatic bounce drive control for determining an irradiation direction of the light from the light emission section based on a result of ranging of a target object, and driving the light emission section in the determined irradiation direction, wherein in a case where a switch unrelated to the automatic bounce drive control has been operated during execution of the automatic bounce drive control, out of control related to an operation of the switch and the automatic bounce drive control, the automatic bounce drive control is preferentially executed, and wherein in a case where a switch related to the automatic bounce drive control has been operated during execution of the automatic bounce drive control, out of control related to an operation of the switch and the automatic bounce drive control, the control related to the operation of the switch is preferentially executed.

In a second aspect of the present invention, there is provided an image pickup system that includes a lighting device capable of changing an irradiation direction of light from a light emission section, an image pickup apparatus, and various switches included in at least one of the lighting device and the image pickup apparatus, the image pickup system being configured to perform automatic bounce drive control for determining an irradiation direction of the light from the light emission section based on a result of ranging of a target object, and driving the light emission section in the determined irradiation direction, wherein in a case where a switch unrelated to the automatic bounce drive control has been operated during execution of the automatic bounce drive control, out of control related to an operation of the switch and the automatic bounce drive control, the automatic bounce drive control is preferentially executed, and wherein in a case where a switch related to the automatic bounce drive control has been operated during execution of the automatic bounce drive control, out of control related to an operation of the switch and the automatic bounce drive control, the control related to the operation of the switch is preferentially executed.

In a third aspect of the present invention, there is provided an automatic irradiation direction control method for an image pickup apparatus that includes a lighting device capable of changing an irradiation direction of light from a light emission section or can have the lighting device attached thereto, and further includes various switches, the image pickup apparatus being configured to perform automatic bounce drive control for determining an irradiation direction of the light from the light emission section based on a result of ranging of a target object, and driving the light emission section in the determined irradiation direction, the automatic irradiation direction control method comprising preferentially executing, in a case where a switch unrelated to the automatic bounce drive control has been operated during execution of the automatic bounce drive control, out of control related to an operation of the switch and the automatic bounce drive control, the automatic bounce drive control, and preferentially executing, in a case where a switch related to the automatic bounce drive control has been operated during execution of the automatic bounce drive control, out of control related to an operation of the switch and the automatic bounce drive control, the control related to the operation of the switch.

In a fourth aspect of the present invention, there is provided a non-transitory computer-readable storage medium storing a computer-executable program for executing an automatic irradiation direction control method for an image pickup apparatus that includes a lighting device capable of changing an irradiation direction of light from a light emission section or can have the lighting device attached thereto, and further includes various switches, the image pickup apparatus being configured to perform automatic bounce drive control for determining an irradiation direction of the light from the light emission section based on a result of ranging of a target object, and driving the light emission section in the determined irradiation direction, wherein the automatic irradiation direction control method comprises preferentially executing, in a case where a switch unrelated to the automatic bounce drive control has been operated during execution of the automatic bounce drive control, out of control related to an operation of the switch and the automatic bounce drive control, the automatic bounce drive control, and preferentially executing, in a case where a switch related to the automatic bounce drive control has been operated during execution of the automatic bounce drive control, out of control related to an operation of the switch and the automatic bounce drive control, the control related to the operation of the switch.

According to the present invention, it is possible to prevent degradation of user-friendliness during execution of automatic bounce drive control.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiment thereof. The component elements described in the following embodiment are described only by way of example, and are by no means intended to limit the scope of the present invention to them alone.

Figure 1:
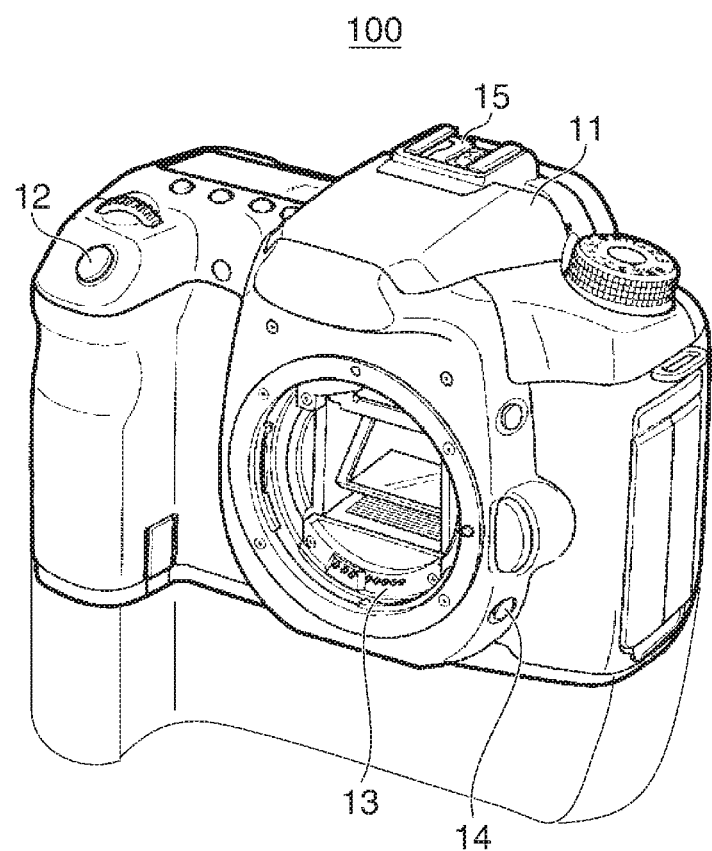
FIG. 1 is a perspective view of a camera as an image pickup apparatus included in an image pickup system according to an embodiment of the present invention.
Figure 2:
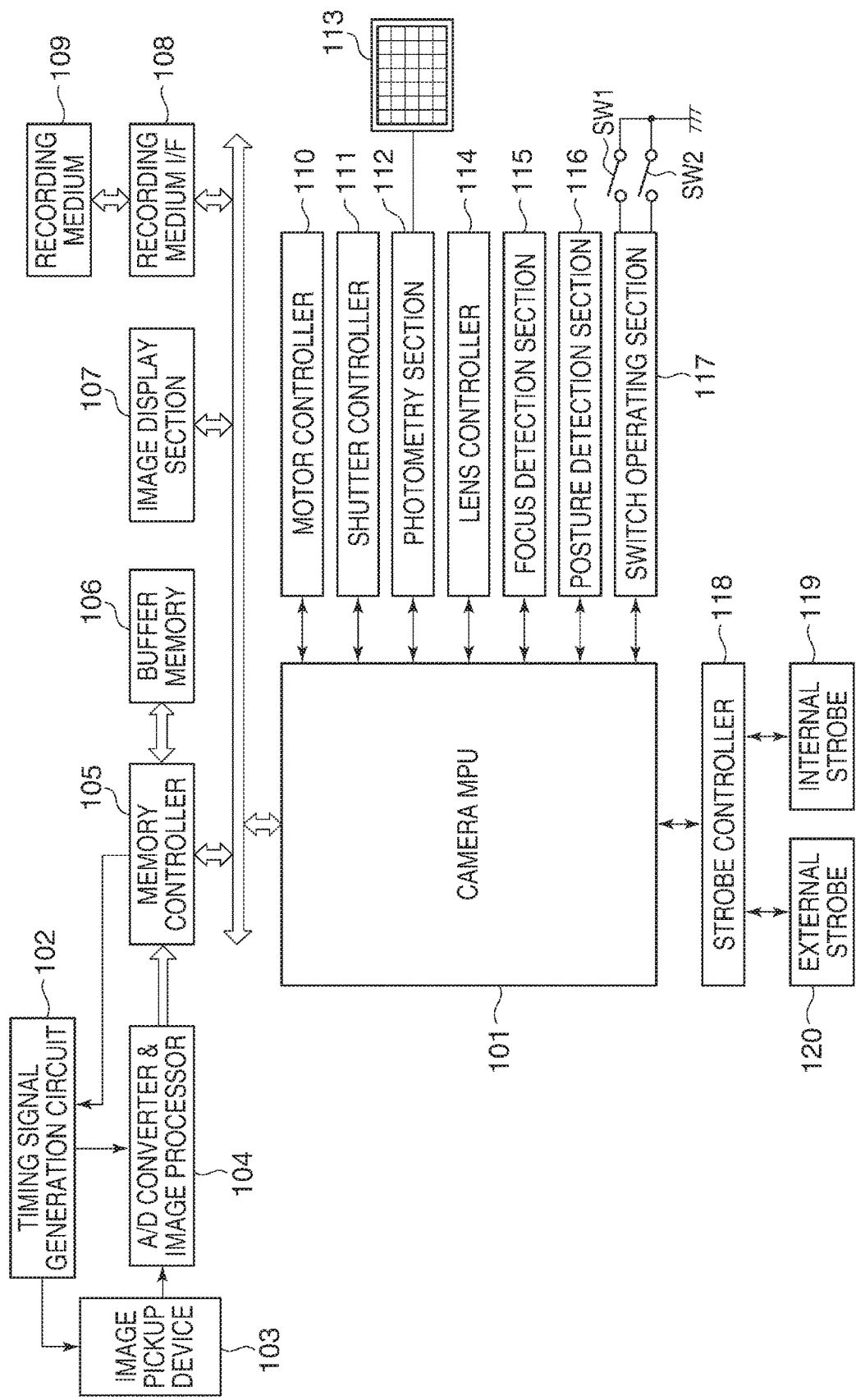
FIG. 2 is a schematic block diagram of the camera as the image pickup apparatus.

FIG. 1 is a schematic perspective view of a camera as an image pickup apparatus included in an image pickup system according to an embodiment of the present invention. FIG. 2 is a schematic block diagram of the camera as the image pickup apparatus.

Referring to FIG. 1, the camera 100 includes a release button 12 provided on a top of a body 11, and a lens mount contact 13 provided on an object side of the body 11, for mounting a lens, not shown, as part of a shooting optical system. Further, the camera 100 includes an aperture control start button 14 provided aside the lens mount contact 13 on the object side of the body 11, and an accessory shoe 15 provided on the top of the body 11.

Referring to FIG. 2, the camera 100 includes the shooting optical system, not shown, a camera MPU 101, a timing signal generation circuit 102, an image pickup device 103, an analog-to-digital converter & image processor 104, a memory controller 105, a buffer memory 106, an image display section 107, and a recording medium interface 108. A recording medium 109 is connected to the recording medium interface 108.

The camera MPU 101 is a microcontroller that controls the overall operation of the camera 100, such as a shooting sequence. The image pickup device 103 that is implemented e.g. by a CCD sensor or a CMOS sensor converts an optical image of an object (target object) formed thereon via the shooting optical system, to an electric signal. The timing signal generation circuit 102 generates a timing signal necessary for operating the image pickup device 103. The analog-to-digital converter & image processor 104 converts an analog signal output from the image pickup device 103 to a digital signal, and generates image data by performing predetermined image processing, such as white balance processing, on the digital signal converted from the analog signal. The memory controller 105 controls operations for reading data from and writing data into the buffer memory 106, and a refresh operation of the buffer memory 106. The buffer memory 106 temporarily stores image data output from the analog-to-digital converter & image processor 104, and image data read out from the recording medium 109. The image display section 107 displays image data stored in the buffer memory 106 as an image. The recording medium interface 108 is an interface for enabling communication between the recording medium 109 and the camera MPU 101. The recording medium 109 that is implemented e.g. by a memory card or a hard disk may be incorporated in the camera 100, or may be removable from the camera 100.

Further, the camera 100 includes a motor controller 110, a shutter controller 111, a photometry section 112, a lens controller 114, a focus detection section 115, a posture detection section 116, a switch operating section 117, and a strobe controller 118, which are connected to the camera MPU 101. A multi-division photometry sensor 113 is connected to the photometry section 112. An internal strobe device (hereinafter referred to as the "internal strobe") 119 incorporated in the camera 100, and an external strobe device (hereinafter referred to as the "external strobe") 120 attached to the camera 100 are connected to the strobe controller 118.

The motor controller 110 controls motors, not shown, according to signals delivered from the camera MPU 101 during an exposure operation, to thereby perform an operation for moving up/down a mirror, not shown, and a charging operation of a shutter, not shown. The shutter controller 111 causes power supply to a shutter front curtain and a shutter rear curtain, neither of which is shown, to be stopped for curtain travel operation according to a signal delivered from the camera MPU 101, to thereby control the exposure operation. The photometry section 112 causes multi-division photometry sensor 113, which detects luminance signals from a plurality of areas formed by dividing an image pickup screen, to deliver the luminance signals of the areas to the camera MPU 101. The camera MPU 101 converts the luminance signals received from the photometry section 112 to digital data by an analog-to-digital converter, not shown, and calculates parameters, such as AV (aperture value), TV (shutter speed), ISO (photographic sensitivity), which are used for exposure adjustment, by using the digital data converted from the luminance signals. Further, the photometry section 112 delivers luminance signals obtained when preliminary light emission toward an object has been performed by the internal strobe 119 or the external strobe 120, to the camera MPU 101. The camera MPU 101 calculates a light amount of strobe main light emission for exposure based on the luminance signals received from the photometry section 112. The lens controller 114 communicates with the camera MPU 101 via the lens mount contact 13, and causes a lens drive motor and a lens aperture motor, neither of which is shown, to operate to thereby perform focus adjustment and aperture control of a lens, not shown. The focus detection section 115 detects a defocus amount with respect to an object for AF (auto focus). The posture detection section 116 detects a rotation angle (tilt) of the camera 100 about each of the gravity direction and the shooting optical axis.

The switch operating section 117 is an operation member provided on the camera 100, and includes e.g. a switch SW1 and a switch SW2. The switch SW1 is a function of the release button 12 as a release preparation button which is turned on by a first stroke of the release button 12. When the switch SW1 is turned on, the camera MPU 101 starts AF and photometry, and starts automatic irradiation direction control (hereinafter referred to as the "automatic bounce drive control") of the external strobe 120. That is, the switch SW1 also functions as an automatic bounce start switch. The switch SW2 is another function of the release button 12 as a release execution button which is turned on by a second stroke of the release button 12, and in response to the turn-on, the camera MPU 101 starts the exposure operation. Further, also when the aperture control start button 14 is depressed, the camera 100 starts the automatic bounce drive control of the external strobe 120. Note that in a case where the external strobe 120 is not attached to the camera 100, the camera 100 starts the aperture control by pressing the aperture control start button 14. Upon receipt of a signal for starting the automatic bounce drive control from the camera MPU 101, the external strobe 120 automatically changes the irradiation direction of light from a light emission section 202 of a strobe head 200b, referred to hereinafter (see FIG. 4), to a predetermined angle.

Further, the switch operating section 117 includes various switches and buttons in addition to the switches SW1 and SW2. Signals from the switches and the buttons are sent to the camera MPU 101. The camera MPU 101 performs an operation assigned to each of the switches and the buttons. The strobe controller 118 gives the internal strobe 119 or the external strobe 120 an instruction of a light emission pattern (preliminary light emission or main light emission), an instruction of light emission based on a light amount of main light emission, and so forth. Communication between the camera MPU 101 and the external strobe 120 is preformed via the strobe controller 118 of the camera 100 and a camera connection section 208, referred to hereinafter (see FIG. 4), of the external strobe 120.

Figure 3A:
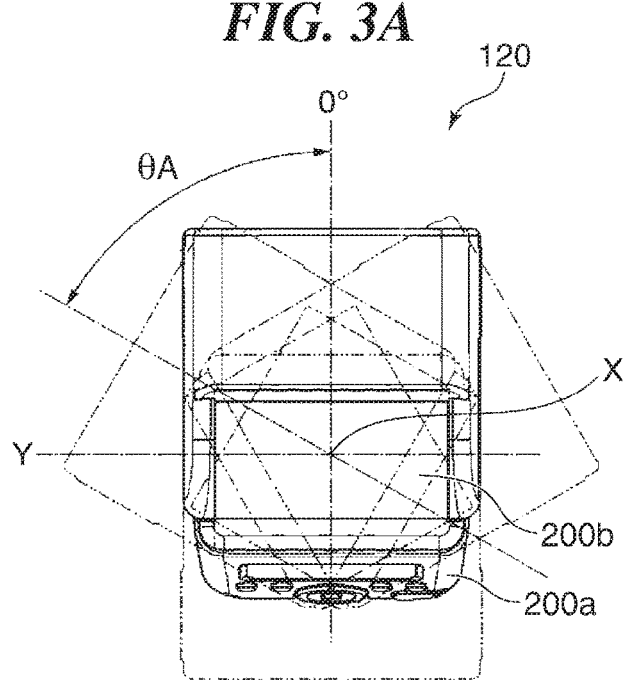
FIG. 3A is a plan view of an external strobe appearing in FIG. 2.
Figure 3B:
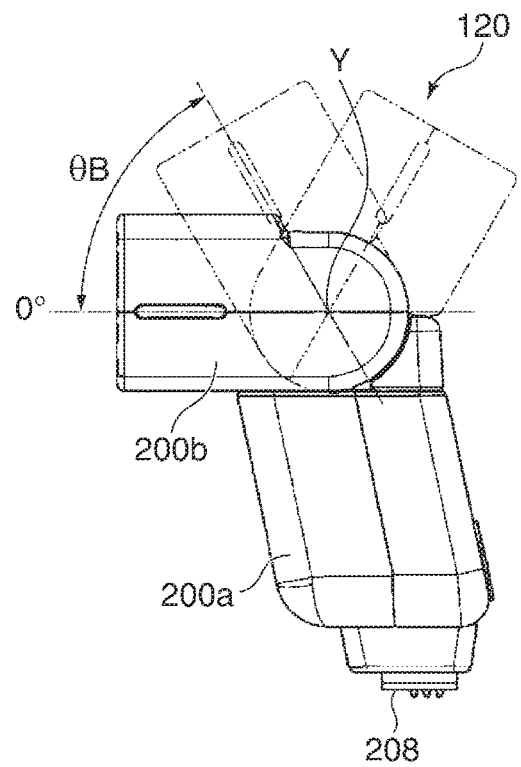
FIG. 3B is a side view of the external strobe.
Figure 3C:
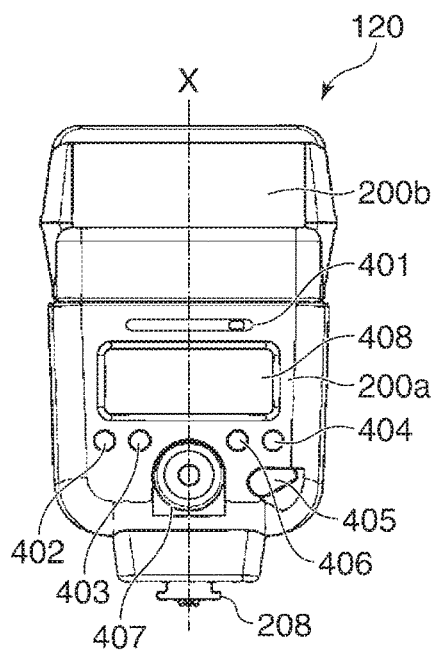
FIG. 3C is a rear view of the external strobe.
Figure 4:
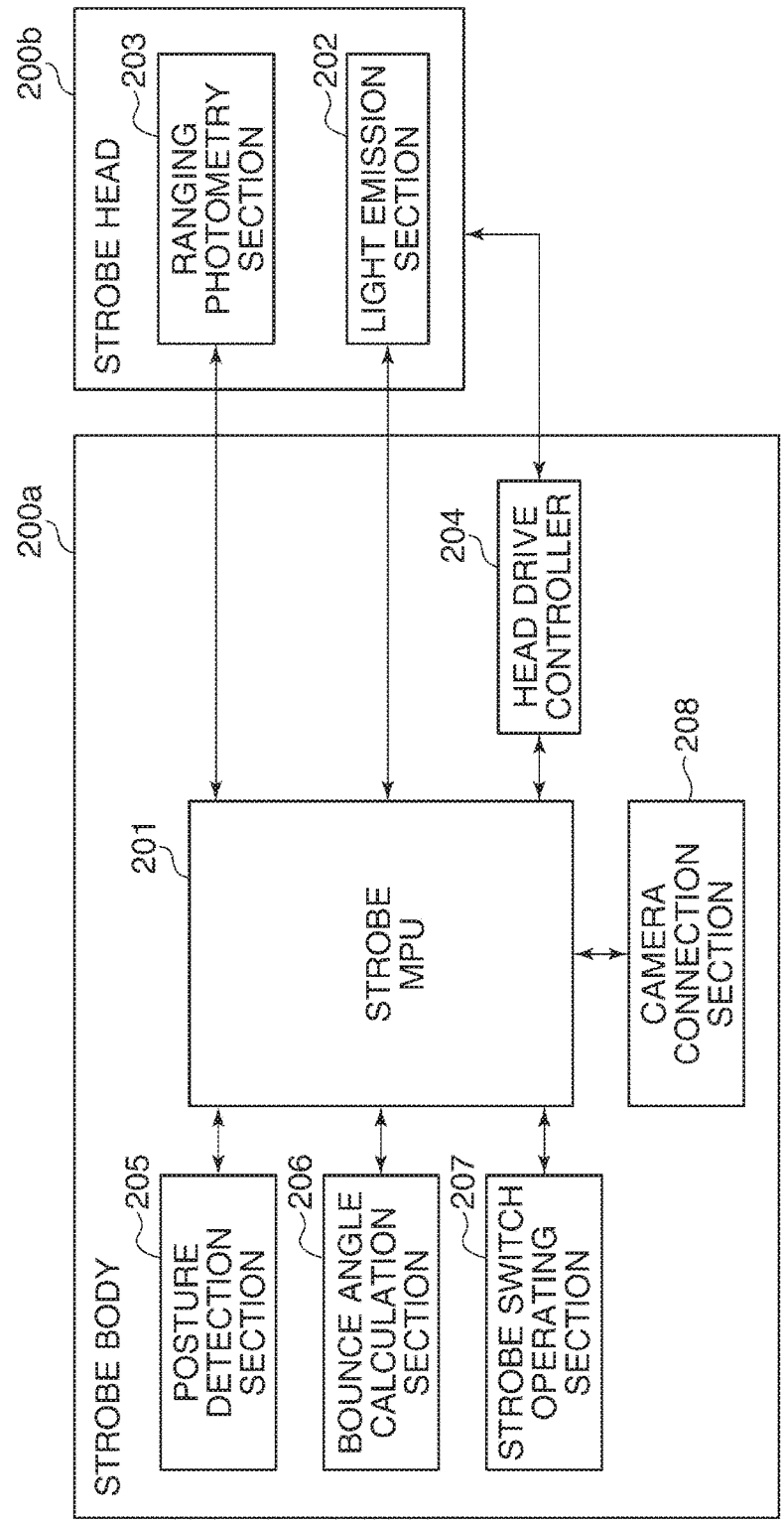
FIG. 4 is a schematic block diagram of the external strobe.

FIGS. 3A to 3C schematically show the external strobe appearing in FIG. 2. FIG. 3A is a plan view of the external strobe, FIG. 3B is a side view of the same, and FIG. 3C is a rear view of the same. FIG. 4 is a schematic block diagram of the external strobe appearing in FIG. 2.

Referring to FIGS. 3A to 3C, the external strobe 120 includes a strobe body 200a and the strobe head 200b (light emission section) rotatable with respect to the strobe body 200a. The strobe head 200b is rotatable with respect to the strobe body 200a about the X-axis, as shown in FIG. 3A, and further about the Y-axis, as shown in FIG. 3B. In the present embodiment, the bounce angle is defined as a combination of a rotation angle $\theta_A$ of the strobe head 200b about the X-axis and a rotation angle $\theta_B$ of the strobe head 200b about the Y-axis. The external strobe 120 is attached to the camera 100 by engaging the camera connection section 208, referred to hereinafter, with the accessory shoe 15 of the camera 100.

Referring to FIG. 4, the strobe body 200a includes a strobe MPU 201, a head drive controller 204, a posture detection section 205, a bounce angle calculation section 206, a strobe switch operating section 207, and the camera connection section 208. The strobe head 200b includes the light emission section 202 and a ranging photometry section 203.

The strobe MPU 201 is a microcontroller that controls the overall operation of the external strobe 120, such as a light emission control sequence, and determination of the bounce angle of the strobe head 200b. The light emission section 202 includes a strobe light emission circuit, not shown, which emits strobe light according to a light emission signal delivered from the strobe MPU 201. The ranging photometry section 203 includes a ranging photometry sensor, not shown, which receives reflected light obtained by causing the strobe light emitted from the light emission section 202 to be reflected from a ranging object, and sends a luminance signal as an output from the ranging photometry sensor to the strobe MPU 201. The strobe MPU 201 converts the luminance signal received from the ranging photometry section 203 to digital data using an analog-to-digital converter, not shown, and calculates a distance to the ranging object based on the digital data. The head drive controller 204 controls the driving of motors, not shown, according to a control signal delivered from the strobe MPU 201 to thereby rotate the strobe head 200b about the X-axis, as shown in FIG. 3A and about the Y-axis, as shown in FIG. 3B, with respect to the strobe body 200a. Further, the head drive controller 204 detects a driving amount of the strobe head 200b, and sends an obtained detection result as relative position information with respect to the strobe body 200a to the strobe MPU 201. The posture detection section 205 detects a rotation angle (tilt) of the strobe body 200a about each of the gravity direction and the shooting optical axis, and sends the tilt as an electric signal to the strobe MPU 201.

The bounce angle calculation section 206 calculates an optimum bounce angle (irradiation direction) based on the distance to the ranging object calculated by the ranging photometry section 203 (ranging result) and the tilt of the strobe body 200a acquired by the posture detection section 205. Further, the bounce angle calculation section 206 sends the calculated optical bounce angle as an electric signal to the strobe MPU 201. The camera connection section 208 is engaged with (connected to) the accessory shoe 15 of the camera 100, and the camera MPU 101 and the strobe MPU 201 perform necessary communication via the strobe controller 118 and the camera connection section 208.

As shown in FIG. 3C, the strobe switch operating section 207 includes an automatic bounce mode selector switch 401, a bounce angle-setting switch 402, and a bounce angle clear switch 403. Further, the strobe switch operating section 207 includes an automatic bounce start switch 404, a strobe power switch 405 (lighting device power switch), a test light emission button 406, and a dial switch 407. The above-mentioned operation members of the automatic bounce mode selector switch 401 to the test light emission button 406 are provided on a rear surface of the strobe body 200a. Further, the dial switch 407 as well is provided on the rear surface of the strobe body 200a, and serves as a light control correction-setting switch and a zoom setting switch. The type of a switch selected by the dial switch 407 is displayed on a display 408 provided on the rear surface of the strobe body 200a.

The automatic bounce mode selector switch 401 is a switch for selecting an automatic bounce drive control mode. In the present embodiment, as the automatic bounce drive control mode, it is possible to set, a full automatic bounce mode (hereinafter referred to as the "AIB-F mode") in which an optimum bounce angle is determined and further the strobe head 200b is automatically driven toward the bounce angle. Further, it is possible to set a sub automatic bounce mode (hereinafter referred to as the "AIB-S mode") in which the strobe head 200b is automatically drive toward a head angle set by a user as a bounce angle. Note that, similar to the bounce angle, the head angle is also defined as a combination of a rotation angle $\theta_A$ of the strobe head 200b about the X-axis and a rotation angle $\theta_B$ of the strobe head 200b about the Y-axis. The bounce angle-setting switch 402 is a switch for causing the strobe MPU 201 to store the current head angle of the strobe head 200b as a set angle of the bounce angle. The bounce angle clear switch 403 is a switch for driving the strobe head 200b toward a default position in which the strobe head 200b is directed toward the front. The automatic bounce start switch 404 is a switch for interrupting automatic bounce drive control being executed, and performing new automatic bounce drive control. The strobe power switch 405 is a lever switch for turning on/off the power of the external strobe 120. The test light emission button 406 is a switch for causing the light emission section 202 to emit strobe light as test light.

In the present embodiment, when the automatic bounce drive control mode is set to the AIB-F mode, and also the aperture control start button 14 of the camera 100 is depressed, an automatic bounce drive instruction is sent from the camera MPU 101 to the strobe MPU 201. Then, the MPU 201 drives the strobe head 200b toward an optimum head angle in order to perform distance measurement. When the automatic bounce drive control mode is set to the AIB-F mode or the AIB-S mode, and also the SW1 of the switch operating section 117 of the camera 100 is operated, a drive-to-set angle instruction is sent from the camera MPU 101 to the strobe MPU 201. At this time, the strobe MPU 201 detects a difference between a bounce angle calculated in a step S708, referred to hereinafter, or a head angle set by the user as a bounce angle, and the current head angle. If the difference is not smaller than a predetermined angle, the strobe MPU 201 drives the strobe head 200b toward the bounce angle calculated in the step S708, referred to hereinafter, or the head angle set by the user as the bounce angle. Signals from the respective switches and buttons of the strobe switch operating section 207 are sent to the strobe MPU 201. The strobe MPU 201 performs an operation assigned to each of the switches and the buttons. Note that a setting state of the external strobe 120 and the like as well are displayed on the display 408.

Figure 5:
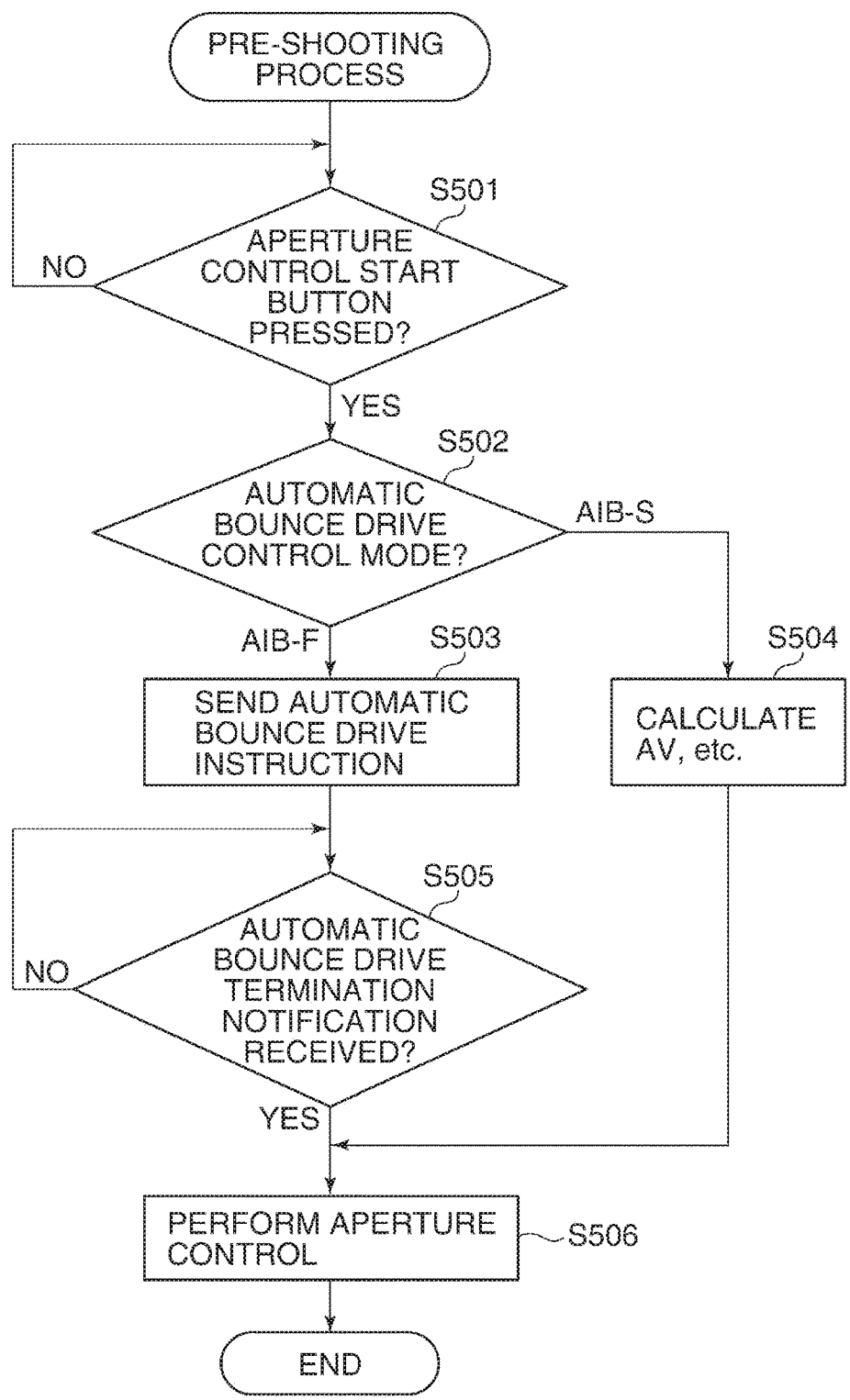
FIG. 5 is a flowchart of a pre-shooting process performed by the camera shown in FIG. 1.

FIG. 5 is a flowchart of a pre-shooting process performed by the camera shown in FIG. 1.

Referring to FIG. 5, first, the camera MPU 101 detects a depressed state of the aperture control start button 14 (step S501). If the aperture control start button 14 has not been depressed, the process returns to the step S501, whereas if the aperture control start button 14 has been depressed, the process proceeds to a step S502, wherein the camera MPU 101 determines whether an automatic bounce drive control mode notified from the strobe MPU 201 to the camera MPU 101 in a step S702, referred to hereinafter, is the AIB-F mode or the AIB-S mode. If the notified automatic bounce drive control mode is the AIB-F mode, the camera MPU 101 sends an automatic bounce drive instruction to the strobe MPU 201 (step S503), and the process proceeds to a step S505. On the other hand, if the notified automatic bounce drive control mode is the AIB-S mode, the camera 100 calculates parameters, such as AV, TV, and ISO (step S504), and then, the camera 100 causes a lens aperture motor, not shown, to operate to thereby perform aperture control as well based on the calculated AV (step S506), followed by terminating the present process. In the step S505, the camera MPU 101 determines whether or not an automatic bounce drive termination notification has been received from the strobe MPU 201. If the automatic bounce drive termination notification has not been received, the process returns to the step S505, whereas if the automatic bounce drive termination notification has been received, the process proceeds to the step S506, followed by terminating the present process.

Figure 6:
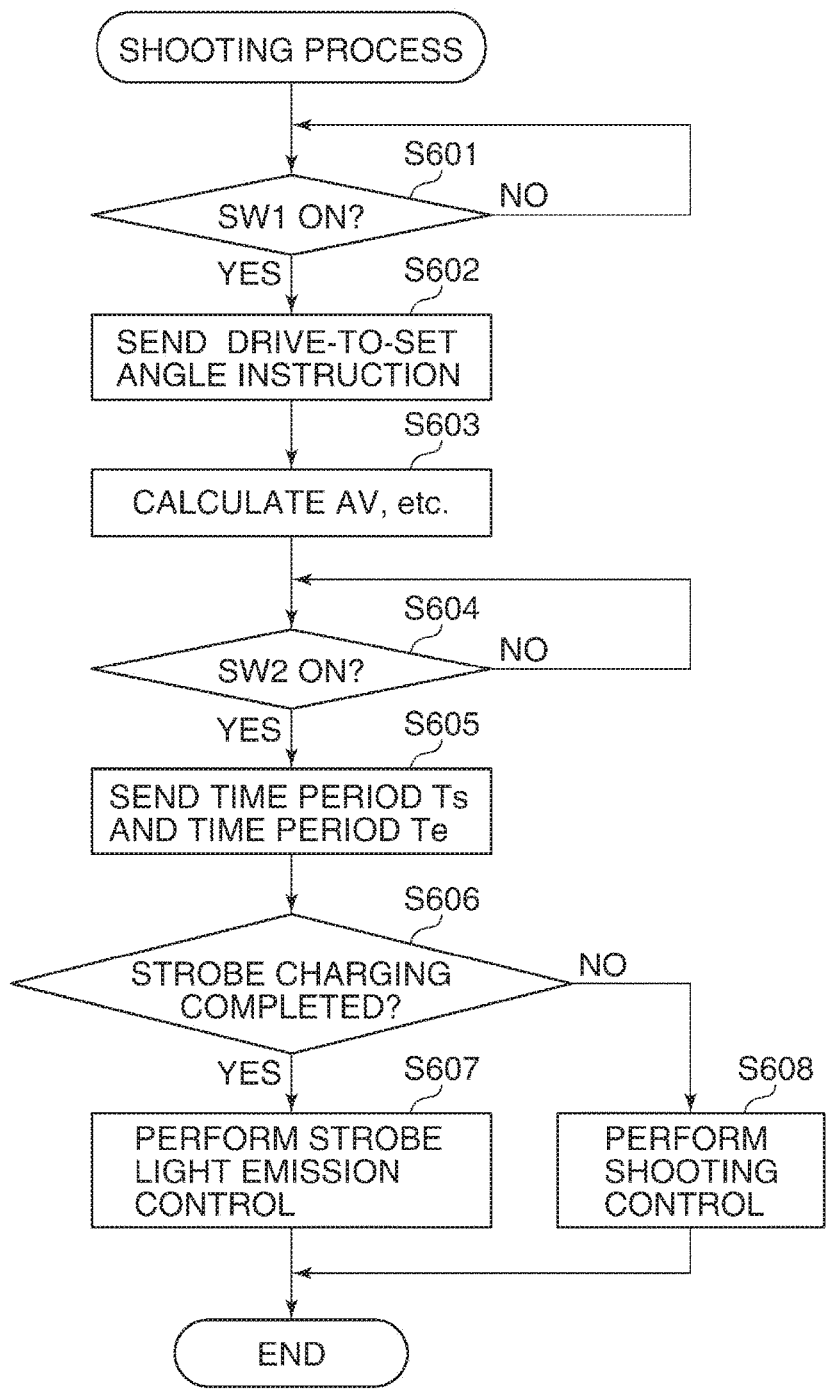
FIG. 6 is a flowchart of a shooting process performed by the camera shown in FIG. 1.

FIG. 6 is a flowchart of a shooting process performed by the camera shown in FIG. 1. The shooting process in FIG. 6 is executed after execution of the process in FIG. 5.

In FIG. 6, first, the camera MPU 101 detects a state of operation of the SW1 (step S601). If the SW1 is not on, the process returns to the step S601, whereas if the SW1 is on, the process proceeds to a step S602, wherein the camera MPU 101 sends the drive-to-set angle instruction to the strobe MPU 201 (step S602). Further, in a step S603, the camera MPU 101 causes the photometry section 112 and the lens controller 114 to start AF and photometry, and calculates parameters, such as AV, TV, and ISO. Then, the camera MPU 101 detects a state of operation of the SW2 (step S604). If the SW2 is not on, the process returns to the step S604, whereas if the SW2 is on, the process proceeds to a step S605, wherein the camera MPU 101 sends a time period Ts to elapse after the SW2 is turned on until shooting is started, and a time period Te to elapse after the SW2 is turned on until the shooting is terminated, to the strobe MPU

201 (step S605). In other words, the time period Ts represents a time period which should elapse after the SW2 is turned on until traveling of the shutter front curtain is started, and the time period Te is calculated by adding TV to the time period Ts. Then, the camera MPU 101 determines whether or not charging of the external strobe 120 has been completed (step S606). More specifically, the camera MPU 101 determines whether or not a strobe charge completion notification has been received from the strobe MPU 201. If the charging of the external strobe 120 has been completed, the camera MPU 101 performs strobe light emission control and the camera 100 shoots the object (step S607). In the strobe light emission control, the camera MPU 101 instructs the strobe controller 118 to perform preliminary light emission. In response to this, the strobe controller 118 instructs the strobe MPU 201 to perform preliminary light emission with a predetermined amount of light. The external strobe 120 starts strobe light emission as the preliminary light emission. The camera MPU 101 calculates a light amount of main light emission for exposure based on a luminance signal acquired from reflected light of the preliminary light emission, and instructs the strobe controller 118 to perform main light emission. In response to this, the strobe controller 118 instructs the strobe MPU 201 to perform main light emission with the calculated light amount. The external strobe 120 starts strobe light emission as the main light emission. In the shooting of the object by the camera 100, the camera MPU 101 performs an exposure operation in synchronism with the main light emission using a predetermined exposure value (AV etc.), and after termination of the exposure operation, displays an image based on image data of the shot object on the image display section 107. Further, the camera MPU 101 causes the image data to be recorded on the recording medium 109, followed by terminating the present process. On the other hand, if the charging of the external strobe 120 has not been completed, the camera 100 shoots the object without causing the external strobe 120 to emit light (step S608). At this time, the camera MPU 101 performs an exposure operation using a predetermined exposure value (AV etc.), and after termination of the exposure operation, displays an image based on image data of the shot object on the image display section 107. Further, the camera MPU 101 causes the image data to be recorded on the recording medium 109, followed by terminating the present process.

Note that although in the processes in FIGS. 5 and 6, the automatic bounce drive control is performed using depression of the aperture control start button 14 or turning on of the SW1 as a trigger, the automatic bounce drive control may be performed using depression of the automatic bounce start switch 404 as a trigger.

Figure 7:
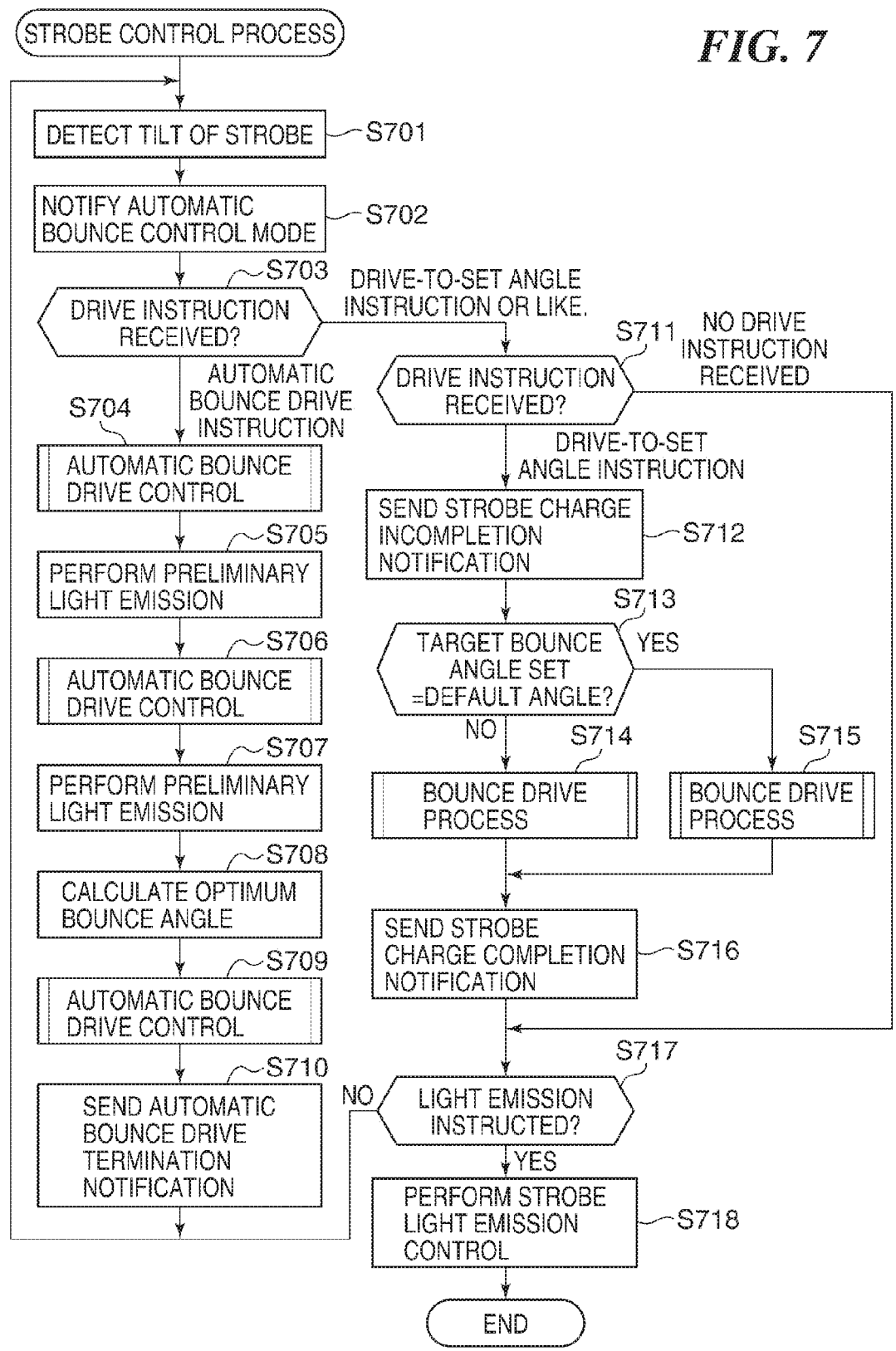
FIG. 7 is a flowchart of a strobe control process performed by the external strobe shown in FIGS. 3A to 3C.

FIG. 7 is a flowchart of a strobe control process performed by the external strobe shown in FIGS. 3A to 3C.

Referring to FIG. 7, first, the posture detection section 205 detects a tilt of the strobe body 200*a* about each of the gravity direction and the shooting optical axis (step S701). Then, the strobe MPU 201 notifies the currently set automatic bounce drive control mode to the camera MPU 101. For example, if the AIB-F mode has been set by the automatic bounce mode selector switch 401, the strobe MPU 201 notifies the camera MPU 101 that the AIB-F mode has been set, whereas if the AIB-S mode has been set by the automatic bounce mode selector switch 401, the strobe MPU 201 notifies the camera MPU 101 that the AIB-S mode has been set (step S702). Next, the strobe MPU 201 determines whether or not the automatic bounce drive instruction has been received from the camera MPU 101 (step S703). If the automatic bounce drive instruction has been received, the process proceeds to a step S704, whereas if the drive-to-set angle instruction has been received or if no drive instruction has been received, the process proceeds to a step S711.

In the step S704, the strobe MPU 201 performs an automatic bounce drive control process for driving the strobe head 200*b* toward a ceiling (target object). The strobe head 200*b* oriented to the ceiling performs preliminary light emission (step S705). At this time, the ranging photometry section 203 receives reflected light from the ceiling, and sends a luminance signal to the strobe MPU 201. The strobe MPU 201 calculates a distance to the ceiling based on the luminance signal. Then, the strobe MPU 201 performs an automatic bounce drive control process for driving the strobe head 200*b* toward the object (step S706). The strobe head 200*b* oriented to the object performs preliminary light emission (step S707). At this time, the ranging photometry section 203 receives reflected light from the object, and sends a luminance signal to the strobe MPU 201. The strobe MPU 201 calculates a distance to the object based on the luminance signal. Note that although the details of the automatic bounce drive control performed in the steps S704 and S706 will be described hereinafter, drive angles through which the strobe head 200*b* is to be rotated in the steps S704 and S706 are calculated based on the tilt of the strobe body 200*a*. For example, in the step S704, in a case where an initial head angle with respect to the gravity direction is equal to X degrees, and an initial head angle with respect to the shooting optical axis is equal to 0 degrees, the drive angle through which the strobe head 200*b* is to rotated with respect to the strobe body 200*a* is calculated as (90-X) degrees in the vertical direction, and also as 0 degrees in the horizontal direction. In the step S706, since the direction of the object matches the shooting optical axis, the drive angle through which the strobe head 200*b* is to rotated with respect to the strobe body 200*a* is calculated as 0 degrees in the vertical direction, and also as 0 degrees in the horizontal direction. Note that the order of execution of the step S704 and the step S706 may be inverted.

Then, an optimum bounce angle is calculated based on the distance to the ceiling and the distance to the object calculated as above (step S708). To calculate the optimum bounce angle, the tilt of the strobe body 200*a* is taken into account. In the following step S709, the strobe MPU 201 performs an automatic bounce drive control process for driving the strobe head 200*b* toward the optimum bounce angle. After that, the strobe MPU 201 sends a notification of termination of the automatic bounce drive control to the camera MPU 101 (step S710), and the process returns to the step S701.

In the step S711, it is determined whether or not the strobe MPU 201 has received the drive-to-set angle instruction from the camera MPU 101. If the strobe MPU 201 has received the drive-to-set angle instruction, the process proceeds to a step S712, whereas if the strobe MPU 201 has not received the drive-to-set angle instruction, the process proceeds to a step S717. In the step S712, even if the external strobe 120 is in a sufficiently charged state (state in which the charge voltage of the external strobe 120 has reached a level at which the external strobe 120 can emit light, or a level higher than that), the strobe MPU 201 sends a strobe charge incompletion notification to the camera MPU 101 so as to prevent the camera from performing strobe light emission control in the step S607. The strobe charge incompletion notification indicates that the charge voltage of the external strobe 120 has not reached the level at which the external strobe 120 can emit light, or a level higher than that. Note that by turning off a charge completion notification lamp, not shown, the user may be notified that it is impossible to perform the shooting involving the strobe light emission control. Then, the strobe MPU 201 determines whether or not a default angle is set as a target bounce angle which is a target head angle of the strobe head 200b (step S713). If an angle other than the default value is set as the target bounce angle, the process proceeds to a step S714, whereas if the default angle is set as the target bounce angle, the process proceeds to a step S715. In the step S714 following the step S713, the strobe MPU 201 performs a bounce drive process to drive the strobe head 200b toward the target bounce angle. In the step S715, the strobe MPU 201 performs the bounce drive process to drive the strobe head 200b toward the default angle. Note that in the case of the default angle, the head angle is equal to 0 degrees in the vertical direction, and also equal to 0 degrees in the horizontal direction. Then, the strobe MPU 201 sends a strobe charge completion notification to the camera MPU 101 (step S716). Next, it is determined whether the strobe MPU 201 has been instructed to perform preliminary light emission or main light emission (step S717). If the strobe MPU 201 has not been instructed to perform either preliminary light emission or main light emission, the process returns to the step S701, whereas if the strobe MPU 201 has been instructed to perform either preliminary light emission or main light emission, the strobe MPU 201 causes the light emission section 202 of the strobe head 200b to emit strobe light (step S718), followed by terminating the present process.

Figure 8:
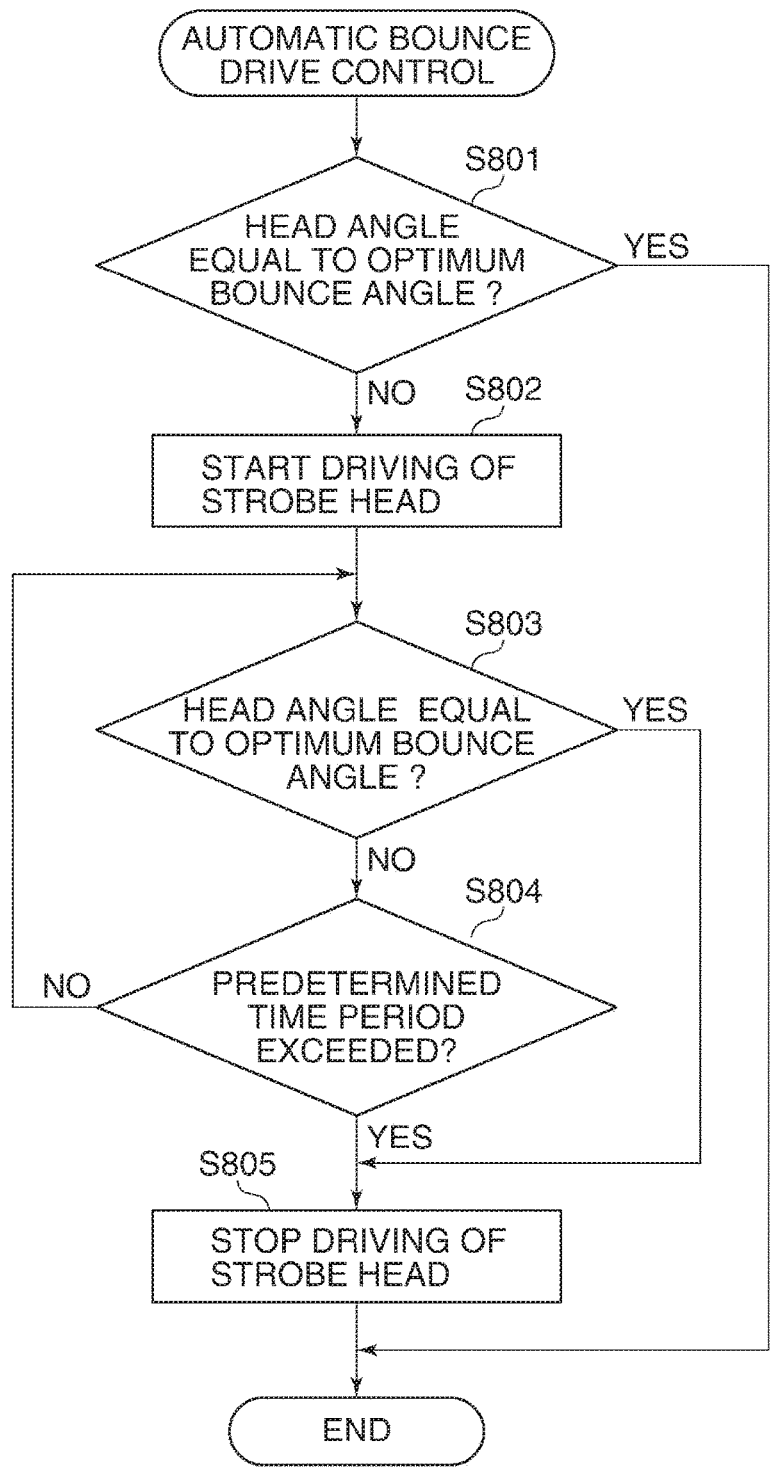
FIG. 8 is a flowchart of an automatic bounce drive control process performed in a step in FIG. 7.

FIG. 8 is a flowchart of the automatic bounce drive control process performed in the step S709 in FIG. 7.

In the automatic bounce drive control process performed in the step S709, first, the strobe MPU 201 compares the current head angle of the strobe head 200b with the optimum bounce angle calculated in the step S708 (step S801). If the current head angle of the strobe head 200b is equal to the optimum bounce angle, the present process is terminated. If the current head angle of the strobe head 200b is not equal to the optimum bounce angle, the head drive controller 204 controls the motors, not shown, to start driving of the strobe head 200b (step S802). Then, during a time period over which the driving of the strobe head 200b is continued, the strobe MPU 201 continues the comparison between the current head angle of the strobe head 200b and the optimum bounce angle calculated in the step S708 (step S803). If the current head angle of the strobe head 200b becomes equal to the optimum bounce angle, the process proceeds to a step S805, whereas if the current head angle of the strobe head 200b is not equal to the optimum bounce angle, it is determined in a step S804 whether or not a motor driving time period over which the motors have been driven by the head drive controller 204 exceeds a predetermined time period. If the time motor driving time period has not exceeded the predetermined time period, the process returns to the step S803, whereas if the motor driving time period has exceeded the predetermined time period, the process proceeds to the step S805, wherein the motors are stopped to stop the driving of the strobe head 200b, followed by terminating the present process.

In the case of the automatic bounce drive control process performed in the step S704, the current head angle of the strobe head 200b is compared with the direction of the ceiling in the steps S801 and S803. Further, in the case of the automatic bounce drive control process performed in the step S706, the current head angle of the strobe head 200b is compared with the direction of the object in the steps S801 and S803.

Figure 9:
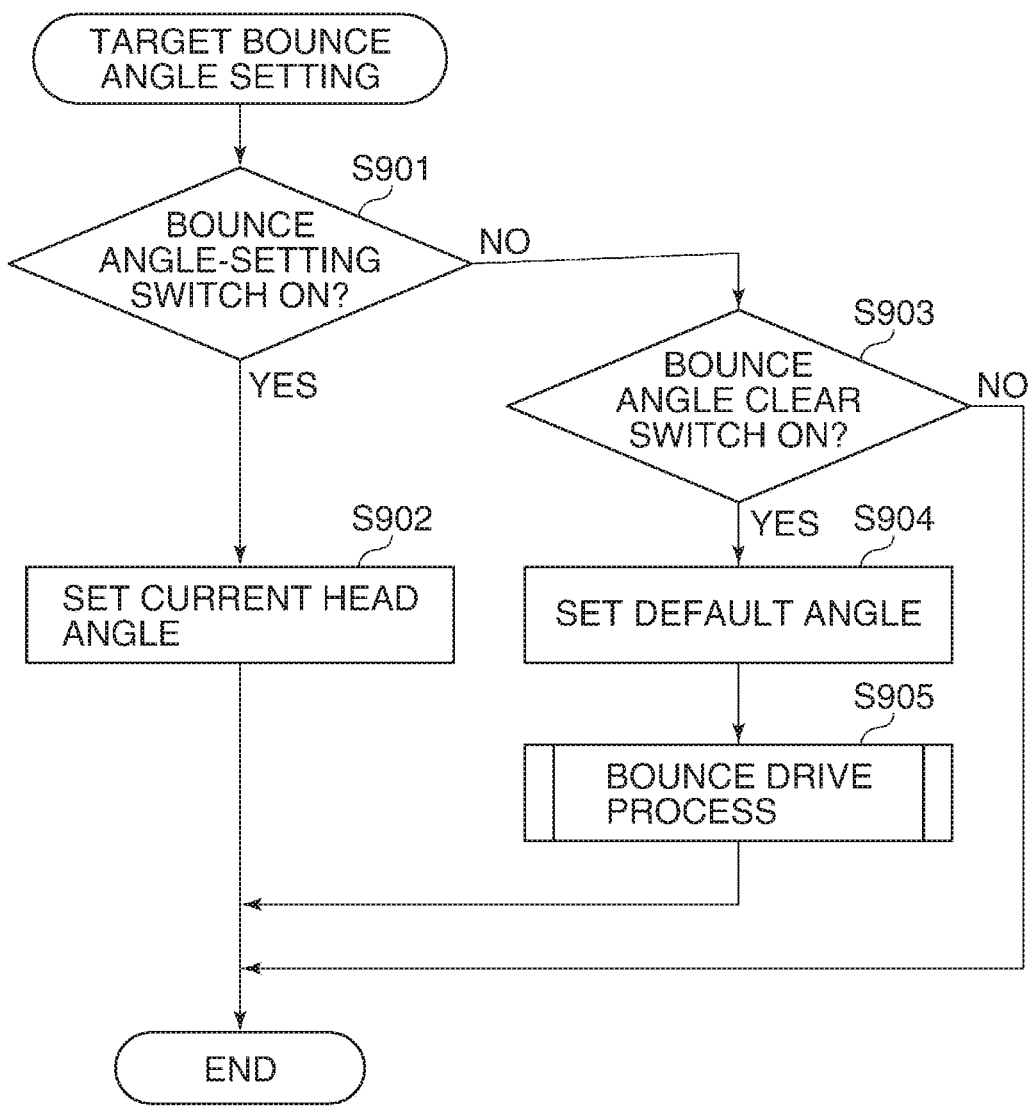
FIG. 9 is a flowchart of a target bounce angle-setting process.

FIG. 9 is a flowchart of a target bounce angle-setting process.

Referring to FIG. 9, first, the strobe MPU 201 detects a state of operation of the bounce angle-setting switch 402 (step S901). If the bounce angle-setting switch 402 is on, the process proceeds to a step S902, whereas if the bounce angle-setting switch 402 is not on, the process proceeds to a step S903. In the step S902 following the step S901, the strobe MPU 201 acquires the current head angle of the strobe head 200b, and sets the acquired current head angle of the strobe head 200b as a target bounce angle, followed by terminating the present process. Note that the target bounce angle is a combination of an angle of the strobe body 200a in the vertical direction and an angle of the strobe body 200a in the horizontal direction, and is set by taking the tilt of the strobe body 200a into account. More specifically, similar to the bounce angle and the head angle, the target bounce angle is defined as a combination of a rotation angle $\theta_A$ of the strobe head 200b about the X-axis and a rotation angle $\theta_B$ of the strobe head 200b about the Y-axis. On the other hand, in the step S903, the strobe MPU 201 detects a state of operation of the bounce angle clear switch 403 (step S903). If the bounce angle clear switch 403 is on, the process proceeds to a step S904, whereas if the bounce angle clear switch 403 is not on, the present process is terminated. In the step S904, the strobe MPU 201 sets a default angle as the target bounce angle, and further performs a bounce drive process (step S905), followed by terminating the present process.

Figure 10:
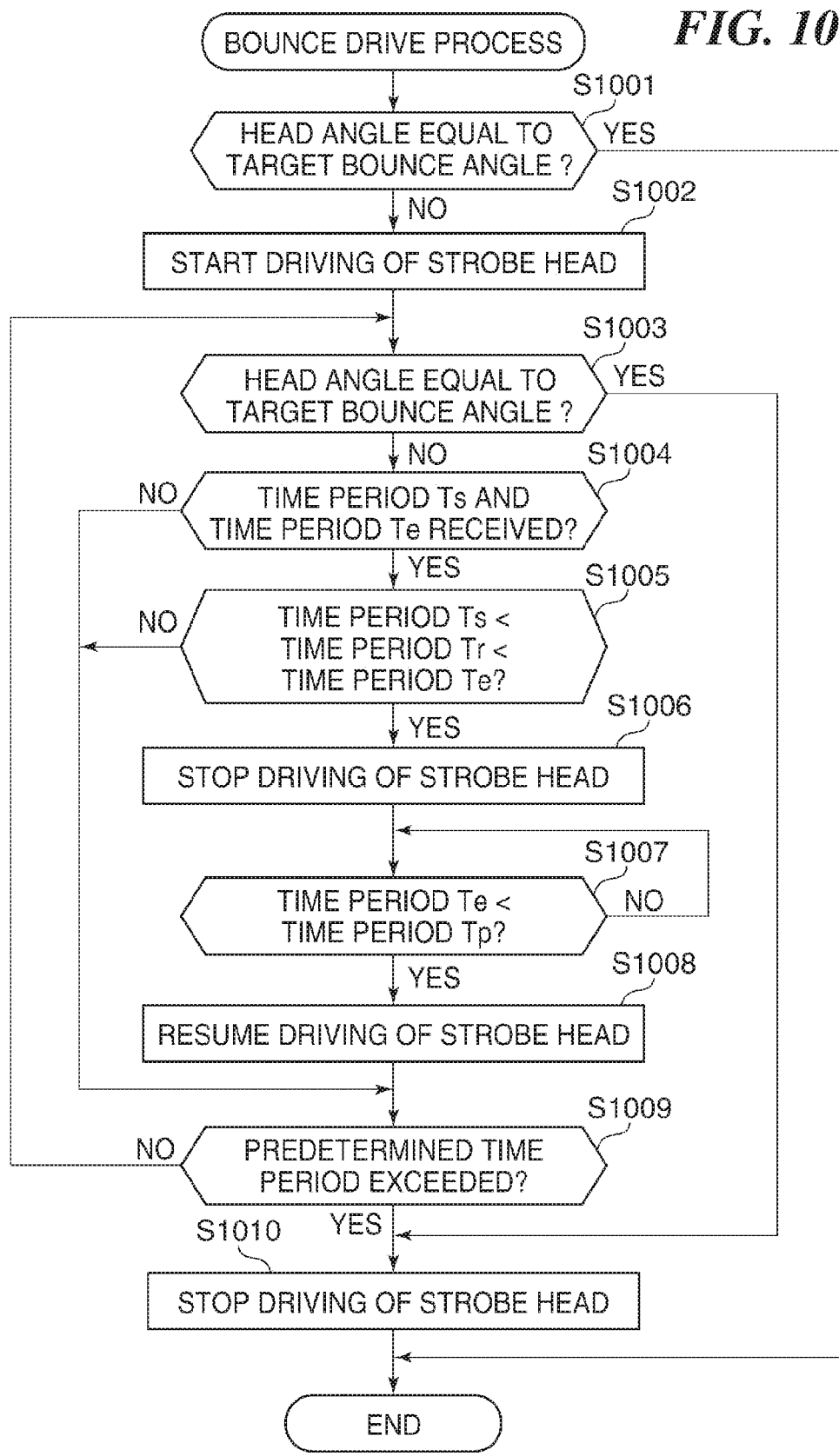
FIG. 10 is a flowchart of a bounce drive process performed in steps in FIG. 7, and a step in FIG. 9.

FIG. 10 is a flowchart of the bounce drive process performed in the steps S714 and S715 in FIG. 7, and the step S905 in FIG. 9.

Referring to FIG. 10, first, the strobe MPU 201 compares the current head angle of the strobe head 200b with the target bounce angle (step S1001). If the current head angle of the strobe head 200b is equal to the target bounce angle, the present process is terminated. If the current head angle of the strobe head 200b is not equal to the target bounce angle, the head drive controller 204 controls the motors, not shown, to start driving of the strobe head 200b (step S1002). After that, the strobe MPU 201 compares the current head angle of the strobe head 200b with the target bounce angle again (step S1003). If the current head angle of the strobe head 200b is equal to the target bounce angle, the process proceeds to a step S1010. If the current head angle of the strobe head 200b is not yet equal to the target bounce angle, the process proceeds to a step S1004. In the step S1004, it is determined whether or not the strobe MPU 201 has received the time period Ts to elapse after turn-on of the SW2 by execution of the step S605 until the shooting is started, and the time period Te to elapse after the turn-on of the SW2 until the shooting is terminated (step S1004). If the strobe MPU 201 has not received the time periods Ts and Te, the process proceeds to a step S1009, whereas if the strobe MPU 201 has received the time periods Ts and Te, the process proceeds to a step S1005. In the step S1005, it is determined whether or not a remaining driving time period Tr is longer than the time period Ts and also shorter than the time period Te. The remaining driving time period Tr is calculated by dividing a remaining drive angle, which is a difference between the current head angle of the strobe head 200b and the target bounce angle, by a drive angular velocity of the strobe head 200b. If the remaining driving time period Tr is not longer than the time period Ts or is not shorter than the time period Te, the process proceeds to the step S1009, whereas if the remaining driving time period Tr is longer than the time period Ts, and also is shorter than the time period Te, the process proceeds to a step S1006, wherein the motors are stopped to stop the driving of the strobe head 200b. Then, it is determined whether or not an elapsed time period Tp measured by a timer, not shown, which is started immediately after sending the time period Ts and the time period Te in the step S605, is longer than the time period Te (step S1007).

If the elapsed time period Tp is not longer than the time period Te, the process returns to the step S1007, whereas if the elapsed time period Tp is longer than the time period Te, the head drive controller 204 controls the motors to resume driving of the strobe head 200b (step S1008). Further, in the step S1008, the time period Ts and the time period Te are reset to 0. This prevents the steps S1005 to S1008 from being executed again thereafter. Then, it is determined whether or not a motor driving time period after resumption of driving of the strobe head 200b has exceeded a predetermined time period (step S1009). If the motor driving time period has not exceeded the predetermined time period, the process returns to the step S1003, whereas if the motor driving time period has exceeded the predetermined time period, the process proceeds to the step S1010, wherein the motors are stopped to stop the driving of the strobe head 200b, followed by terminating the present process.

According to the process in FIG. 10, the driving of the strobe head 200b is stopped during a time period after the lapse of the time period Ts which is to elapse from the turn-on of the switch SW2 to the start of the shooting until the lapse of the time period Te which is to elapse from the turn-on of the switch SW2 to the end of the shooting. This makes it possible to prevent the shooting from failing due to vibration generated by the driving of the motors and the strobe head 200b during shooting of the object by the camera 100.

Figure 11:
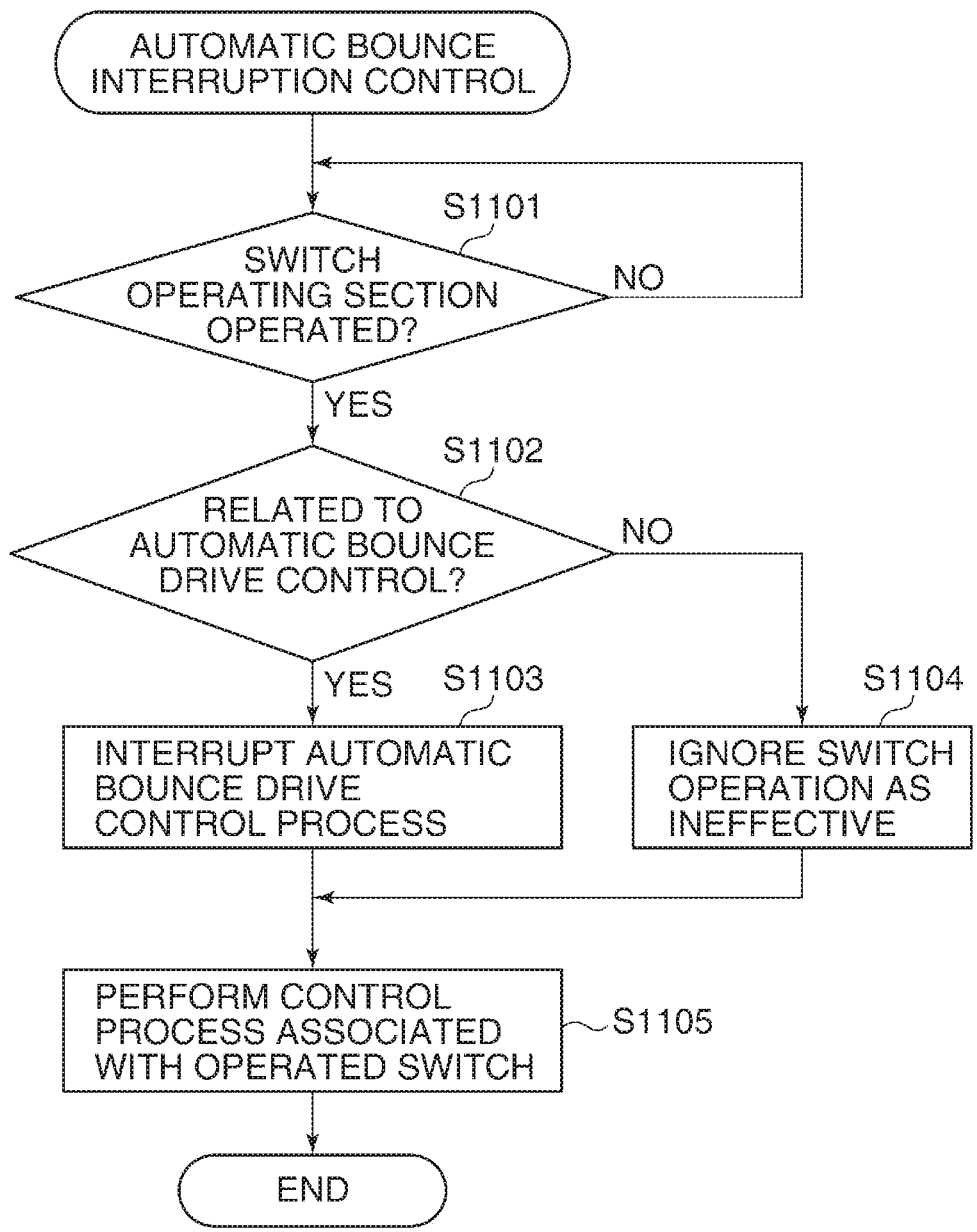
FIG. 11 is a flowchart of an automatic bounce interruption control process as a method of automatic irradiation direction control for the image pickup apparatus according to the present embodiment.

FIG. 11 is a flowchart of an automatic bounce interruption control process as a method of automatic irradiation direction control for the image pickup apparatus according to the present embodiment.

The automatic bounce interruption control process in FIG. 11 is performed e.g. when the automatic bounce drive control process in any of the steps S704, S706 and S709 in FIG. 7 is performed. Referring to FIG. 11, first, the strobe MPU 201 determines whether or not any switch of the strobe switch operating section 207 has been operated (step S1101). If no switch of the strobe switch operating section 207 has been operated, the process returns to the step S1101. If any of the switches of the strobe switch operating section 207 has been operated, the strobe MPU 201 determines whether or not the operated switch is a switch related to the automatic bounce drive control (step S1102). In the present embodiment, the automatic bounce mode selector switch 401, the automatic bounce start switch 404, and the strobe power switch 405 are included in the switches related to the automatic bounce drive control. The other switches of the strobe switch operating section 207, such as the test light emission button 406 and the dial switch 407 that serves as the light control correction-setting switch and the zoom setting switch are included in the switches unrelated to the automatic bounce drive control. If any of the switches unrelated to the automatic bounce drive control has been operated, the operation of the switch is ignored as ineffective, instead of performing a control process associated therewith (step S1104), and the present process is terminated to continue the automatic bounce drive control process being executed. On the other hand, in a case where the automatic bounce mode selector switch 401 has been operated, the automatic bounce drive control process is interrupted (step S1103), and data on the automatic bounce drive control process is initialized (step S1105), followed by terminating the present process. In this case, the automatic bounce drive control process is continued by driving the strobe head 200b toward the front (object). In a case where the automatic bounce start switch 404 has been operated, the present automatic bounce drive control process is interrupted (step S1103), and a new automatic bounce drive control process is performed (step S1105), followed by terminating the present process. In this case, the new automatic bounce drive control process is performed, whereby the automatic bounce drive control process is continued. Also when the strobe power switch 405 has been operated, the automatic bounce drive control process is interrupted (step S1103), and the power of the external strobe 120 is turned off (step S1105), followed by terminating the present process. That is, when any of the switches related to the automatic bounce drive control has been operated, the automatic bounce drive control process being executed is interrupted, and a control process associated with the switch is performed.

According to the automatic bounce interruption control process in FIG. 11, when any of the switches unrelated to the automatic bounce drive control has been operated, execution of the automatic bounce drive control process is continued (preferentially executed). When any of the switches related to the automatic bounce drive control has been operated, the automatic bounce drive control process being executed is interrupted, and control associated with the operated switch is performed (preferentially executed). With this control, by operating one of the switches related to the automatic bounce drive control, the user can realize interruption of the automatic bounce drive control process being executed. As a consequence, to perform a new automatic bounce drive control process, the user is not required to wait for termination of the automatic bounce drive control process being executed. This makes it possible to prevent user-friendliness from being degraded during execution of the automatic bounce drive control process. Further, when any of the switches unrelated to the automatic bounce drive control has been operated, the operation of the switch is ignored as ineffective, and no control process associated therewith is performed. When the user experiences that even when one of the switches unrelated to the automatic bounce drive control has been operated, no control process associated with the operation of the switch is performed, thereafter, the user will come to avoid operations of the switches unrelated to the automatic bounce drive control during execution of the automatic bounce drive control process. As a consequence, it is possible to suppress vibrations of the camera 100 and the external strobe 120 caused by operating of any of the switches during execution of the automatic bounce drive control process, whereby it is possible to positively prevent the reduction of ranging accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the above-described embodiment, when any of the switches unrelated to the automatic bounce drive control has been operated, not only the operation of the switch is ignored as ineffective but also a message to the effect that the operation of the switch is inhibited may be displayed on the display 408. With this, the user understands that the operation of the switch is ignored during execution of the automatic bounce drive control process. As a consequence, thereafter, a possibility can be increased that the user avoids operations of the switches unrelated to the automatic bounce drive control during execution of the automatic bounce drive control process. This makes it possible to reduce a possibility that the camera 100 and the external strobe 120 are vibrated during execution of the automatic bounce drive control. Alternatively, in the above-described embodiment, when any of the switches unrelated to the automatic bounce drive control has been operated, instead of ignoring the operation of the switch, a control process associated with the operation of the switch may be performed after termination of the automatic bounce drive control process being executed.

Further, although in the above-described embodiment, the present invention is applied to the drive control of the external strobe 120, the present invention may be applied to the drive control of the internal strobe 119 insofar as the internal strobe 119 includes a strobe head swingable to a predetermined angle. Furthermore, the present invention may be applied to operation of any of the switches of the camera 100, which are related to the automatic bounce drive control. In this case, the camera MPU 101 determines whether or not any of the switches SW1 and SW2 and the aperture control start button 14 of the switch operating section 117 has been pressed, and performs the same process as the automatic bounce interruption control process in FIG. 11.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-208651 filed Oct. 25, 1016 which is hereby incorporated by reference herein in its entirety.

What is claimed is:

1. An image pickup apparatus that includes a lighting device capable of changing an irradiation direction of light from a light emission section or can have the lighting device attached thereto, and further includes various switches, the image pickup apparatus being configured to perform automatic bounce drive control for determining an irradiation direction of the light from the light emission section based on a result of ranging of a target object, and driving the light emission section in the determined irradiation direction, wherein in a case where a switch among the various switches included in the image pickup apparatus, which is unrelated to the automatic bounce drive control, has been operated during execution of the automatic bounce drive control, out of control related to an operation of the switch and the automatic bounce drive control, the automatic bounce drive control is preferentially executed, wherein in a case where a switch among the various switches included in the image pickup apparatus, which is related to the automatic bounce drive control, has been operated during execution of the automatic bounce drive control, out of control related to an operation of the switch and the automatic bounce drive control, the control related to the operation of the switch is preferentially executed, and wherein the switch unrelated to the automatic bounce drive control is a button or a dial switch.

2. The image pickup apparatus according to claim 1, wherein in the case where the switch unrelated to the automatic bounce drive control has been operated during execution of the automatic bounce drive control, the operation of the switch is ignored as ineffective, and the control related to the operation of the switch is not performed.

3. The image pickup apparatus according to claim 1, wherein in the case where the switch unrelated to the automatic bounce drive control has been operated during execution of the automatic bounce drive control, a notification to the effect that the operation of the switch is inhibited is made.

4. The image pickup apparatus according to claim 1, wherein the switch related to the automatic bounce drive control is a switch for causing the execution of the automatic bounce drive control to be interrupted.

5. The image pickup apparatus according to claim 1, wherein the switch related to the automatic bounce drive control includes at least one of an automatic bounce mode selector switch, an automatic bounce start switch, and a lighting device power switch.

6. An image pickup system that includes a lighting device capable of changing an irradiation direction of light from a light emission section, an image pickup apparatus, and various switches included in at least one of the lighting device and the image pickup apparatus, the image pickup system being configured to perform automatic bounce drive control for determining an irradiation direction of the light from the light emission section based on a result of ranging of a target object, and driving the light emission section in the determined irradiation direction, wherein in a case where a switch among the various switches included in the lighting device and the image pickup apparatus, which is unrelated to the automatic bounce drive control, has been operated during execution of the automatic bounce drive control, out of control related to an operation of the switch and the automatic bounce drive control, the automatic bounce drive control is preferentially executed, wherein in a case where a switch among the various switches included in the lighting device and the image pickup apparatus, which is related to the automatic bounce drive control, has been operated during execution of the automatic bounce drive control, out of control related to an operation of the switch and the automatic bounce drive control, the control related to the operation of the switch is preferentially executed, and wherein the switch unrelated to the automatic bounce drive control is a button or a dial switch.

7. An automatic irradiation direction control method for an image pickup apparatus that includes a lighting device capable of changing an irradiation direction of light from a light emission section or can have the lighting device attached thereto, and further includes various switches, the image pickup apparatus being configured to perform automatic bounce drive control for determining an irradiation direction of the light from the light emission section based on a result of ranging of a target object, and driving the light emission section in the determined irradiation direction, the automatic irradiation direction control method comprising:

preferentially executing, in a case where a switch among the various switches included in the image pickup apparatus, which is unrelated to the automatic bounce drive control, has been operated during execution of the automatic bounce drive control, out of control related to an operation of the switch and the automatic bounce drive control, the automatic bounce drive control; and preferentially executing, in a case where a switch among the various switches included in the image pickup apparatus, which is related to the automatic bounce drive control, has been operated during execution of the automatic bounce drive control, out of control related to an operation of the switch and the automatic bounce drive control, the control related to the operation of the switch, wherein the switch unrelated to the automatic bounce drive control is a button or a dial switch.

8. A lighting apparatus capable of performing automatic bounce drive control for determining an irradiation direction of light from a light emission section based on a result of ranging of a target object, including various switches and driving the light emission section in the determined irradiation direction, wherein in a case where a switch among the various switches included in the lighting apparatus, which is unrelated to the automatic bounce drive control, has been operated during execution of the automatic bounce drive control, the automatic bounce drive control is preferentially executed, wherein in a case where a switch among the various switches included in the lighting apparatus, which is related to the automatic bounce drive control, has been operated during execution of the automatic bounce drive control, the control related to the operation of the switch is preferentially executed, and wherein the switch unrelated to the automatic bounce drive control is a button or a dial switch included in the lighting apparatus.

9. An image pickup apparatus that includes a lighting device capable of changing an irradiation direction of light from a light emission section or can have the lighting device attached thereto, and further includes various switches, the image pickup apparatus being configured to perform automatic bounce drive control for determining an irradiation direction of the light from the light emission section based on a result of ranging of a target object, and driving the light emission section in the determined irradiation direction, wherein in a case where a switch among the various switches included in the image pickup apparatus, which is unrelated to the automatic bounce drive control, has been operated during execution of the automatic bounce drive control, out of control related to an operation of the switch and the automatic bounce drive control, the automatic bounce drive control is preferentially executed, wherein in a case where a switch among the various switches included in the image pickup apparatus, which is related to the automatic bounce drive control, has been operated during execution of the automatic bounce drive control, out of control related to an operation of the switch and the automatic bounce drive control, the control related to the operation of the switch is preferentially executed, and wherein in the case where the switch unrelated to the automatic bounce drive control has been operated during execution of the automatic bounce drive control, a notification to the effect that the operation of the switch is inhibited is made.

10. The image pickup apparatus according to claim 1, wherein the switch unrelated to the automatic bounce drive control is a switch operation of which has possibility of causing vibrations in the lighting device.

* * * * *